United States Patent
Tripathy et al.

(10) Patent No.: US 10,210,188 B2
(45) Date of Patent: Feb. 19, 2019

(54) MULTI-TIERED DATA STORAGE IN A DEDUPLICATION SYSTEM

(71) Applicant: QUEST SOFTWARE INC., Aliso Viejo, CA (US)

(72) Inventors: Tarun Kumar Tripathy, Newark, CA (US); Murali Bashyam, Fremont, CA (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 248 days.

(21) Appl. No.: 15/365,812

(22) Filed: Nov. 30, 2016

(65) Prior Publication Data

US 2018/0150485 A1    May 31, 2018

(51) Int. Cl.
*G06F 17/00* (2006.01)
*G06F 17/30* (2006.01)

(52) U.S. Cl.
CPC .. *G06F 17/30303* (2013.01); *G06F 17/30321* (2013.01); *G06F 17/30345* (2013.01); *G06F 17/30589* (2013.01)

(58) Field of Classification Search
CPC ......... G06F 17/30303; G06F 17/30321; G06F 17/30589; G06F 17/30345
USPC ....................................................... 707/692
See application file for complete search history.

(56) References Cited

U.S. PATENT DOCUMENTS

| | | | | |
|---|---|---|---|---|
| 8,285,681 B2 * | 10/2012 | Prahlad | ................. | G06F 17/302 707/640 |
| 8,578,096 B2 * | 11/2013 | Malige | ............. | G06F 17/30584 711/117 |
| 8,700,634 B2 * | 4/2014 | Apte | ................. | G06F 17/30156 707/741 |
| 8,732,133 B2 * | 5/2014 | Attarde | ............... | G06F 11/3442 707/664 |
| 9,171,008 B2 * | 10/2015 | Prahlad | ................. | G06F 17/302 |
| 9,218,376 B2 * | 12/2015 | Muller | ............. | G06F 17/30283 |
| 9,454,537 B2 * | 9/2016 | Prahlad | ................. | G06F 17/302 |

(Continued)

FOREIGN PATENT DOCUMENTS

WO    WO 2016/079629 A1 *    5/2016    ............. G06F 12/00

OTHER PUBLICATIONS

Al-Kiswany, Samer, et al., "VMFlock: VM Co-Migration for the Cloud", HPDC '11, San Jose, CA, Jun. 8-11, 2011, 13 pages.*

*Primary Examiner* — Robert Stevens
(74) *Attorney, Agent, or Firm* — Maschoff Brennan (57) ABSTRACT

Systems, methods, and devices are disclosed herein for data deduplication and storage. Methods include identifying first criteria associated with a data block included in a plurality of data blocks, the data block being identified based on a blockmap and an index, the blockmap characterizing a file stored in a deduplication repository, the index identifying data store identifiers, reference count data, and second criteria associated with the plurality of data blocks. The second criteria include the first criteria, and the first criteria characterize input/output (I/O) activity associated with the data block. The methods may also include identifying data stores based on the first criteria, the data stores being included in data storage tiers. The data stores are identified based on the I/O activity associated with the data block. The methods further include updating the first criteria stored in the index and associated with the data block.

20 Claims, 5 Drawing Sheets

(56) References Cited

U.S. PATENT DOCUMENTS

| | | | | |
|---|---|---|---|---|
| 9,830,342 B2* | 11/2017 | Dolph | ............... | G06F 17/30371 |
| 2012/0110259 A1* | 5/2012 | Mills | ....................... | G06F 13/00 |
| | | | | 711/113 |
| 2012/0150826 A1* | 6/2012 | Vijayan Retnamma | ..................... | |
| | | | | G06F 17/30312 |
| | | | | 707/692 |
| 2013/0091102 A1* | 4/2013 | Nayak | ................... | G06F 3/0613 |
| | | | | 707/692 |
| 2013/0339298 A1* | 12/2013 | Muller | .............. | G06F 17/30283 |
| | | | | 707/640 |
| 2016/0147797 A1* | 5/2016 | Dolph | ............... | G06F 17/30371 |
| | | | | 707/692 |

\* cited by examiner

MULTI-TIERED DATA STORAGE IN A DEDUPLICATION SYSTEM

TECHNICAL FIELD

The present disclosure relates generally to the deduplication of data, and more specifically to multi-tiered data storage associated with the deduplication of data.

DESCRIPTION OF RELATED ART

Data is often stored in storage systems that are accessed via a network. Network-accessible storage systems allow potentially many different client systems to share the same set of storage resources. A network-accessible storage system can perform various operations that render storage more convenient, efficient, and secure. For instance, a network-accessible storage system can receive and retain potentially many versions of backup data for files stored at a client system. As well, a network-accessible storage system can serve as a shared file repository for making a file or files available to more than one client system.

Some data storage systems may perform operations related to data deduplication. In computing, data deduplication is a specialized data compression technique for eliminating duplicate copies of repeating data. Deduplication techniques may be used to improve storage utilization or network data transfers by effectively reducing the number of bytes that must be sent or stored. In the deduplication process, unique blocks of data, or byte patterns, are identified and stored during a process of analysis. As the analysis continues, other data blocks are compared to the stored copy and a redundant data block may be replaced with a small reference that points to the stored data block. Given that the same byte pattern may occur dozens, hundreds, or even thousands of times, the amount of data that must be stored or transferred can be greatly reduced. The match frequency may depend at least in part on the data block size. Different storage systems may employ different data block sizes or may support variable data block sizes.

Deduplication differs from standard file compression techniques. While standard file compression techniques typically identify short repeated substrings inside individual files, storage-based data deduplication involves inspecting potentially large volumes of data and identify potentially large sections—such as entire files or large sections of files—that are identical, in order to store only one copy of a duplicate section. In some instances, this copy may be additionally compressed by single-file compression techniques. For example, a typical email system might contain 100 instances of the same one megabyte (MB) file attachment. In conventional backup systems, each time the system is backed up, all 100 instances of the attachment are saved, requiring 100 MB storage space. With data deduplication, the storage space required may be limited to only one instance of the attachment. Subsequent instances may be referenced back to the saved copy for deduplication ratio of roughly 100 to 1.

SUMMARY

The following presents a simplified summary of the disclosure in order to provide a basic understanding of certain embodiments of the present disclosure. This summary is not an extensive overview of the disclosure and it does not delineate the scope of the present disclosure. Its sole purpose is to present some concepts disclosed herein in a simplified form as a prelude to the more detailed description that is presented later.

Systems, methods, and devices are disclosed herein for data deduplication and storage. Methods may include identifying a first plurality of criteria associated with a data block included in a plurality of data blocks, the data block being identified based on a blockmap and an index, the blockmap characterizing a file stored in a deduplication repository, the index identifying data store identifiers, reference count data, and a second plurality of criteria associated with the plurality of data blocks, the second plurality of criteria including the first plurality of criteria, the first plurality of criteria characterizing input/output (I/O) activity associated with the data block. The methods may further include identifying at least one data store based on at least one of the first plurality of criteria, the at least one data store being included in a data storage tier of a plurality of data storage tiers, the at least one data store being identified based, at least in part, on the I/O activity associated with the data block. The methods may also include updating the first plurality of criteria stored in the index and associated with the data block.

In various embodiments, the first plurality of criteria comprises a first data store identifier, second data store identifier, a reference count, an access frequency metric, and a data access timestamp. In some embodiments, the access frequency metric characterizes a frequency at which the data block is accessed. In various embodiments, the methods further comprise implementing at least one data transfer operation on the data block, the data transfer operation being identified based on the first plurality of criteria, where the at least one data store is a first data store of a plurality of data stores, and wherein the plurality of data stores further comprises a second data store. In some embodiments, the data transfer operation is a data replication operation from the first data store included in a first data storage tier to the second data store included in a data second storage tier.

In various embodiments, the data transfer operation is a migrate operation from the first data store included in a data storage tier to a second data store included in a second data storage tier. In some embodiments, the plurality of data stores further comprises a third data store included in a third data storage tier and a fourth data store included in a fourth data storage tier. In various embodiments, the first data storage tier has the lowest access latency, wherein the second data storage tier has the second lowest access latency, wherein the third data storage tier has the third lowest access latency, and wherein the fourth data storage tier has the highest access latency. In some embodiments, the at least one data store and an associated data storage tier is identified based on an index. In various embodiments, the methods may further comprise generating the index based on a plurality of I/O patterns associated with a plurality of data blocks included in the blockmap of the deduplication repository, where the I/O patterns characterize data storage and access requests associated with the plurality of data blocks.

Systems are also disclosed herein that may include a local machine. The systems may further include a networked storage device comprising one or more processors configured to identify a first plurality of criteria associated with a data block included in a plurality of data blocks, the data block being identified based on a blockmap and an index, the blockmap characterizing a file stored in a deduplication repository, the index identifying data store identifiers, reference count data, and a second plurality of criteria associated with the plurality of data blocks, the second plurality of criteria including the first plurality of criteria, the first plurality of criteria characterizing input/output (I/O) activity associated with the data block. The one or more processors may be further configured to identify at least one data store based on at least one of the first plurality of criteria, the at least one data store being included in a data storage tier of a plurality of data storage tiers, the at least one data store being identified based, at least in part, on the I/O activity associated with the data block. The one or more processors may be further configured to update the first plurality of criteria stored in the index and associated with the data block.

In various embodiments, the first plurality of criteria comprises a first data store identifier, second data store identifier, a reference count, an access frequency metric, and a data access timestamp, and wherein the access frequency metric characterizes a frequency at which the data block is accessed. In some embodiments, the one or more processors are further configured to implement at least one data transfer operation on the data block, the data transfer operation being identified based on the plurality of criteria, where the at least one data store is a first data store of a plurality of data stores, and wherein the plurality of data stores further comprises a second data store. In various embodiments, the at least one data store is identified based on an index. In some embodiments, the one or more processors are further configured to generate the index based on a plurality of I/O patterns associated with a plurality of data blocks included in the blockmap of the deduplication repository, where the I/O patterns characterize data storage and access requests associated with the plurality of data blocks.

Further disclosed herein are devices that may include a communications interface configured to be communicatively coupled with a local machine and one or more processors configured to identify a first plurality of criteria associated with a data block included in a plurality of data blocks, the data block being identified based on a blockmap and an index, the blockmap characterizing a file stored in a deduplication repository, the index identifying data store identifiers, reference count data, and a second plurality of criteria associated with the plurality of data blocks, the second plurality of criteria including the first plurality of criteria, the first plurality of criteria characterizing input/output (I/O) activity associated with the data block. The one or more processors may be further configured to identify at least one data store based on at least one of the first plurality of criteria, the at least one data store being included in a data storage tier of a plurality of data storage tiers, the at least one data store being identified based, at least in part, on the I/O activity associated with the data block. The one or more processors may be further configured to update the first plurality of criteria stored in the index and associated with the data block.

In various embodiments, the first plurality of criteria comprises a first data store identifier, second data store identifier, a reference count, an access frequency metric, and a data access timestamp, and wherein the access frequency metric characterizes a frequency at which the data block is accessed. In some embodiments, the one or more processors are further configured to implement at least one data transfer operation on the data block, the data transfer operation being identified based on the plurality of criteria, where the at least one data store is a first data store of a plurality of data stores, and wherein the plurality of data stores further comprises a second data store. In some embodiments, the at least one data store is identified based on an index. In various embodiments, the one or more processors are further configured to generate the index based on a plurality of I/O patterns associated with a plurality of data blocks included in the blockmap of the deduplication repository, where the I/O patterns characterize data storage and access requests associated with the plurality of data blocks.

BRIEF DESCRIPTION OF THE DRAWINGS

The disclosure may best be understood by reference to the following description taken in conjunction with the accompanying drawings, which illustrate particular embodiments of the present disclosure.

DESCRIPTION OF PARTICULAR EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques and mechanisms of the present disclosure will be described in the context of particular data storage mechanisms. However, it should be noted that the techniques and mechanisms of the present disclosure apply to a variety of different data storage mechanisms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

As discussed above, file systems may be backed up and stored in storage systems. Moreover, such backing up of data may include storage systems capable of implementing various deduplication protocols to compress the backed up data. Such storage systems may be referred to herein as deduplication repositories. When implemented, such deduplication repositories may be capable of storing file systems that may be numerous terabytes in size.

As also discussed above, a deduplication repository may be implemented for primary, backup, or archival purposes. Accordingly, incoming data for a file may be parsed using a parser which results in data chunks or data blocks. The data chunks or blocks may be fingerprinted, and the fingerprints may be checked in an index to see if they exist in the system somewhere. If the data chunk or data block exists, then the blockmap (or inode) of the file that includes the data chunk or data block is modified to update a file offset and the fingerprint of a data chunk or data block that belongs at that offset. If the data chunk or data block does not exist, it is added to a new data store and then the blockmap (or inode) of the file is modified to update a file offset and the fingerprint of a data chunk or data block that belongs at that offset. As will be discussed in greater detail below, a blockmap may be implemented as a map which keeps track of file offsets and fingerprints of data chunks or data blocks. Using the fingerprint as key, it is possible to lookup the fingerprint in an index to access the data store that stores that data chunk or data block.

In various embodiments, deduplication repositories may be implemented such that data stored in block devices included in such deduplication repositories may be allocated to various data storage tiers depending, at least in part, on input/output (I/O) patterns associated with data blocks. If a chunk or data block is constantly or frequently being accessed, it may be moved to a lower latency data storage tier which may have an underlying device such as a solid state drive (SSD). If a chunk or data block is rarely being accessed, it may be moved to higher latency data storage tier which may have an underlying device such as Blu-ray Jukebox. Thus, according to various embodiments, by migrating and/or replicating between various data storage tiers having different input/output characteristics and data storage characteristics, systems, methods, and devices disclosed herein improve the performance and latency of deduplication repositories, as well as increase the efficiency with which hardware is utilized. As will be discussed in greater detail below, embodiments disclosed herein may replicate and/or migrate chunks or data blocks between various tiers of data storage based on certain criteria thereby improving access latency and performance of data as well as uniquely identifying and relocating chunks or data blocks to appropriate tiers of storage.

EXAMPLE EMBODIMENTS

Figure 1:
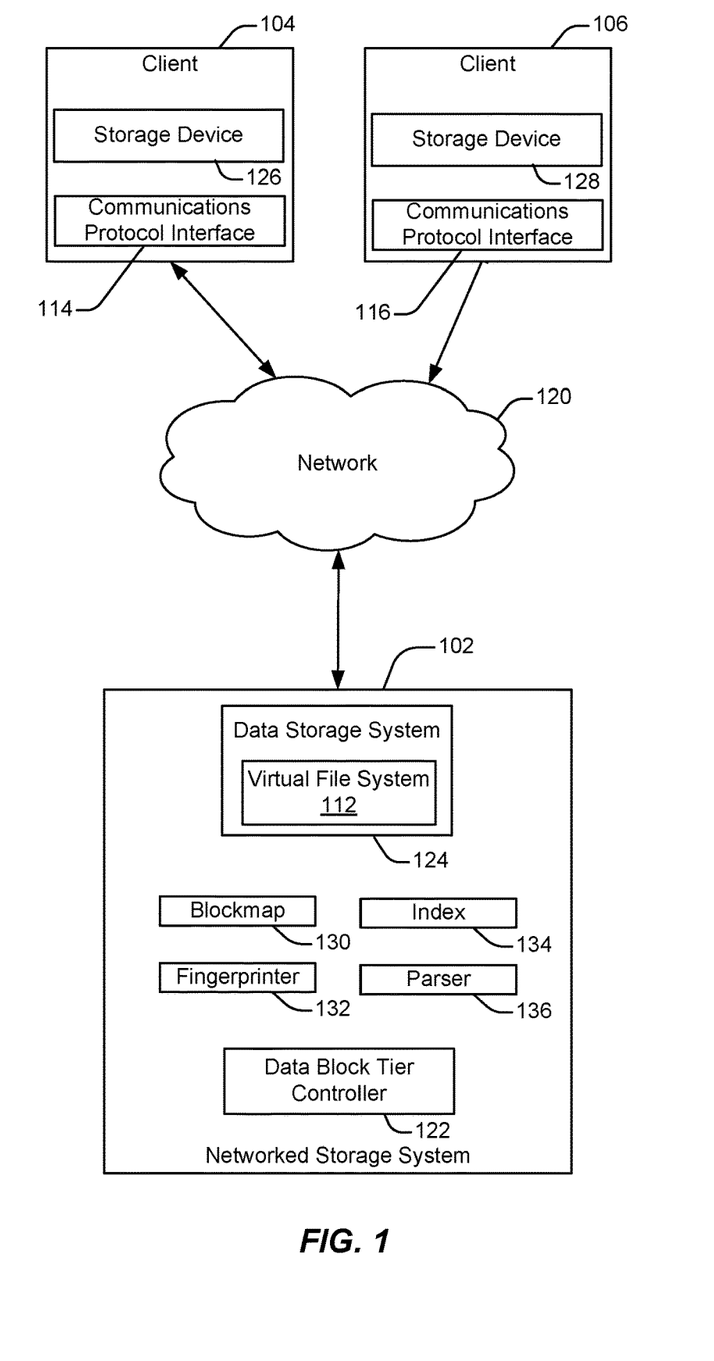
FIG. 1 shows an example of a client system for accessing a deduplication repository, configured in accordance with some embodiments.

FIG. 1 shows an example of a client system for accessing a deduplication repository, configured in accordance with some embodiments. The network storage arrangement shown in FIG. 1 includes a networked storage system 102 in communication with client systems 104 and 106 via a network 120. The client systems are configured to communicate with the networked storage system 102 via the communications protocol interfaces 114 and 116. The networked storage system 102 is configured to process file-related requests from the client system via the virtual file system 112.

According to various embodiments, the client systems and networked storage system shown in FIG. 1 may communicate via a network 120. The network 120 may include any nodes or links for facilitating communication between the end points. For instance, the network 120 may include one or more WANs, LANs, MANs, WLANs, or any other type of communication linkage. In some implementations, the networked storage system 102 may be any network-accessible device or combination of devices configured to store information received via a communications link. For instance, the networked storage system 102 may include one or more DR6000 storage appliances provided by Dell Computer of Round Rock, Tex.

In some embodiments, the networked storage system 102 may be operable to provide one or more storage-related services in addition to simple file storage. For instance, the networked storage system 102 may be configured to provide deduplication services for data stored on the storage system. Alternately, or additionally, the networked storage system 102 may be configured to provide backup-specific storage services for storing backup data received via a communication link. Accordingly, a networked storage system 102 may be configured as a deduplication repository, and may be referred to herein as a deduplication repository or remote deduplication repository.

According to various embodiments, each of the client systems 104 and 106 may be any computing device configured to communicate with the networked storage system 102 via a network or other communications link. For instance, a client system may be a desktop computer, a laptop computer, another networked storage system, a mobile computing device, or any other type of computing device. Although FIG. 1 shows two client systems, other network storage arrangements may include any number of client systems. For instance, corporate networks often include many client systems in communication with the same networked storage system.

According to various embodiments, the client systems may communicate with the networked storage system 102 via the communications protocol interfaces 114 and 116. Different client systems may employ the same communications protocol interface or may employ different communications protocol interfaces. The communications protocol interfaces 114 and 116 shown in FIG. 1 may function as channel protocols that include a file-level system of rules for data exchange between computers. For example, a communications protocol may support file-related operations such as creating a file, opening a file, reading from a file, writing to a file, committing changes made to a file, listing a directory, creating a directory, etc. Types of communication protocol interfaces that may be supported may include, but are not limited to: Network File System (NFS), Common Internet File System (CIFS), Server Message Block (SMB), Open Storage (OST), Web Distributed Authoring and Versioning (WebDAV), File Transfer Protocol (FTP), Trivial File Transfer Protocol (TFTP).

In some implementations, a client system may communicate with a networked storage system using the NFS protocol. NFS is a distributed file system protocol that allows a client computer to access files over a network in a fashion similar to accessing files stored locally on the client computer. NFS is an open standard, allowing anyone to implement the protocol. NFS is considered to be a stateless protocol. A stateless protocol may be better able to withstand a server failure in a remote storage location such as the networked storage system 102. NFS also supports a two-phased commit approach to data storage. In a two-phased commit approach, data is written non-persistently to a storage location and then committed after a relatively large amount of data is buffered, which may provide improved efficiency relative to some other data storage techniques.

In some implementations, a client system may communicate with a networked storage system using the CIFS protocol. CIFS operates as an application-layer network protocol. CIFS is provided by Microsoft of Redmond Wash. and is a stateful protocol. In some embodiments, a client system may communicate with a networked storage system using the OST protocol provided by NetBackup. In some embodiments, different client systems on the same network may communicate via different communication protocol interfaces. For instance, one client system may run a Linux-based operating system and communicate with a networked storage system via NFS. On the same network, a different client system may run a Windows-based operating system and communicate with the same networked storage system via CIFS. Then, still another client system on the network may employ a NetBackup backup storage solution and use the OST protocol to communicate with the networked storage system 102.

According to various embodiments, the virtual file system layer (VFS) 112 is configured to provide an interface for client systems using potentially different communications protocol interfaces to interact with protocol-mandated operations of the networked storage system 102. For instance, the virtual file system 112 may be configured to send and receive communications via NFS, CIFS, OST or any other appropriate protocol associated with a client system.

In various embodiments, the virtual file system 112 as well as various block devices stored and maintained by the networked storage system 102 may be stored in data storage system 124. As will be discussed in greater detail below, data storage system 124 may include several data stores. In various embodiments, a data store may be a collection of data blocks or chunks. As discussed above, a blockmap representing a file in a deduplication repository contains file offsets and related fingerprints. At any file offset, using its fingerprint as key, it is possible to lookup an index, such as index 134, to determine the data block (or chunk) that belongs at that file offset. The index also yields data store ID. As previously stated, a data store may be a collection of chunks or data blocks. These data stores may exist in several tiers of data storage. Accordingly, the storage of data may be implemented across several tiers of data storage that may each be identified by unique identifiers. Moreover, each tier of data storage may include several data stores or data storage devices, which may also be identified based on a unique data store identifier. In this way, storage locations at different data stores implemented in different tiers may be identified. More specifically, a block device implemented at a deduplication repository, such as networked storage system 102, may have an associated blockmap, such as blockmap 130, and various data blocks which may be stored across the tiers of data storage system 124. As will be discussed in greater detail below with reference to FIG. 4 and FIG. 5, the storage of the data blocks across data tiers may be implemented such that frequently accessed and utilized data blocks are stored at tiers of storage that have low latencies but may also have low storage capacities, while data blocks that are rarely accessed and utilized are stored at tiers of storage that may have high latencies, but also have high storage capacities.

In various embodiments, different tiers of storage may also be configured to support particular data transfer operations. For example, a particular tier of storage may be configured to support one or both of a replicate and/or migrate data transfer operation. In some embodiments, data storage tiers that support replicate operations may also be configured to implement a least recently used (LRU) cache. In various embodiments, data storage tiers that do not support replicate operations might not be configured to implement an LRU. In some embodiments, the LRU is a counted LRU with a fixed number of entries. Frequently accessed items are added at the head of the LRU. If the LRU is full, an item is removed from the tail of the LRU. The number of entries in the LRU may equal the number of chunks of data, such as data blocks, that can exist in this particular data storage tier. For example, in a first tier, as further discussed below, the number of data blocks that may be stored at the first tier may be determined by dividing the size or storage capacity of the storage device underlying the first tier, which may be an SSD device, by an average data chunk or data block size.

In a specific example, data storage system 124 may include a particular number of data storage tiers, that each include data storage devices having particular input output characteristics. For example, data storage system 124 may include four tiers of data storage which may be identified by tier identifiers 1, 2, 3, and 4, respectively. In some embodiments, the tiers of data storage may be ordered in ascending order of access latency. Accordingly, tier 1 may have the lowest latency, tier 2 may have a higher latency than tier 1, tier 3 may have a higher latency than tier 2, and tier 4 may have the highest latency. The different tiers may also be different storage mediums having different characteristics that result in such latencies. For example, tier 1 may be a fast hard disk, such as a solid state drive (SSD). Tier 2 may be a slower hard disk that has greater storage capacity, such as a SATA disk drive. Tier 3 may be a storage medium that is slower than a SATA disk, such as a Blueray jukebox. Moreover, tier 4 may be slower than the previous three, and may be a storage entity, such as a cloud storage device. In this example, Tier 1, Tier 2, and Tier 3 may all be configured to support replicate operations, and may all be configured to implement an LRU.

In some implementations, the network storage arrangement shown in FIG. 1 may be operable to support a variety of storage-related operations. For example, the client system 104 may use the communications protocol interface 114 to create a file on the networked storage system 102, to store data to the file, to commit the changes to memory, and to close the file. In some embodiments, networked storage system 102 may include a fingerprinter, such as fingerprinter 132, which may be configured to generate unique representations, or fingerprints, of incoming data blocks. In various embodiments, these data blocks may be parsed from the incoming stream using a parser, such as parser 136. As another example, the client system 106 may use the communications protocol interface 116 to open a file on the networked storage system 102, to read data from the file, and to close the file. In particular embodiments, a communications protocol interface 114 may be configured to perform various techniques and operations described herein. For instance, a customized implementation of an NFS, CIFS, or OST communications protocol interface may allow more sophisticated interactions between a client system and a networked storage system.

According to various embodiments, a customized communications protocol interface may appear to be a standard communications protocol interface from the perspective of the client system. For instance, a customized communications protocol interface for NFS, CIFS, or OST may be configured to receive instructions and provide information to other modules at the client system via standard NFS, CIFS, or OST formats. However, the customized communications protocol interface may be operable to perform non-standard operations such as a client-side data deduplication. For example, similar to protocols such as NFS, CIFS, or OST which are file based protocols, it is possible to support block based protocols such as SCSI (Small Computer Systems interface) or even simple block access. Block access may be implemented to access deduplication repository containers which include exported block devices, instead of files, as will be discussed in greater detail below, that utilize block based protocols. Moreover, a blockmap, such as blockmap 130, may be maintained on the networked storage system 102 which serves as the metadata of the incoming file or exported block device in the deduplication repository. The blockmap may include a file offset (or device offset in the case of an exported block device) and a fingerprint of a data chunk or data block that belongs at that offset. Using the fingerprint as key, it is possible to lookup an index to get to the data store that contains the data chunk or data block.

In various embodiments, networked storage system 102 may further include data block tier controller 122. According to some embodiments, data block tier controller is configured to analyze input and output activity associated with data blocks stored in various data stores in the networked storage system 102. Data block tier controller 122 is further configured to identify and manage a data storage location associated with such data blocks which may be represented in blockmap 130. As will be discussed in greater detail below, virtual file system 112 and various block devices may be distributed across multiple data stores in multiple tiers of data storage. As discussed above, such data stores may be created on different data storage devices or systems that each have different data storage characteristics. For example, at one point the data stores in the system may be on four tiers each having different latency characteristics, where some are faster, or have a lower latency, than others. This is because the data storage tiers can be of varying latencies. Data block tier controller 122 is configured to analyze input and output activity associated with the data blocks to determine which data store and tier the data blocks should be stored in. Moreover, data block tier controller 122 may be further configured to update blockmap 130 to accurately represent the storage of the data blocks stored at networked storage system 102. In the blockmap, a fingerprint representing a data chunk or data block may be used to lookup an entry in an index, such as index 134, that points to a data store and the data storage tier in which it is stored.

Figure 2:
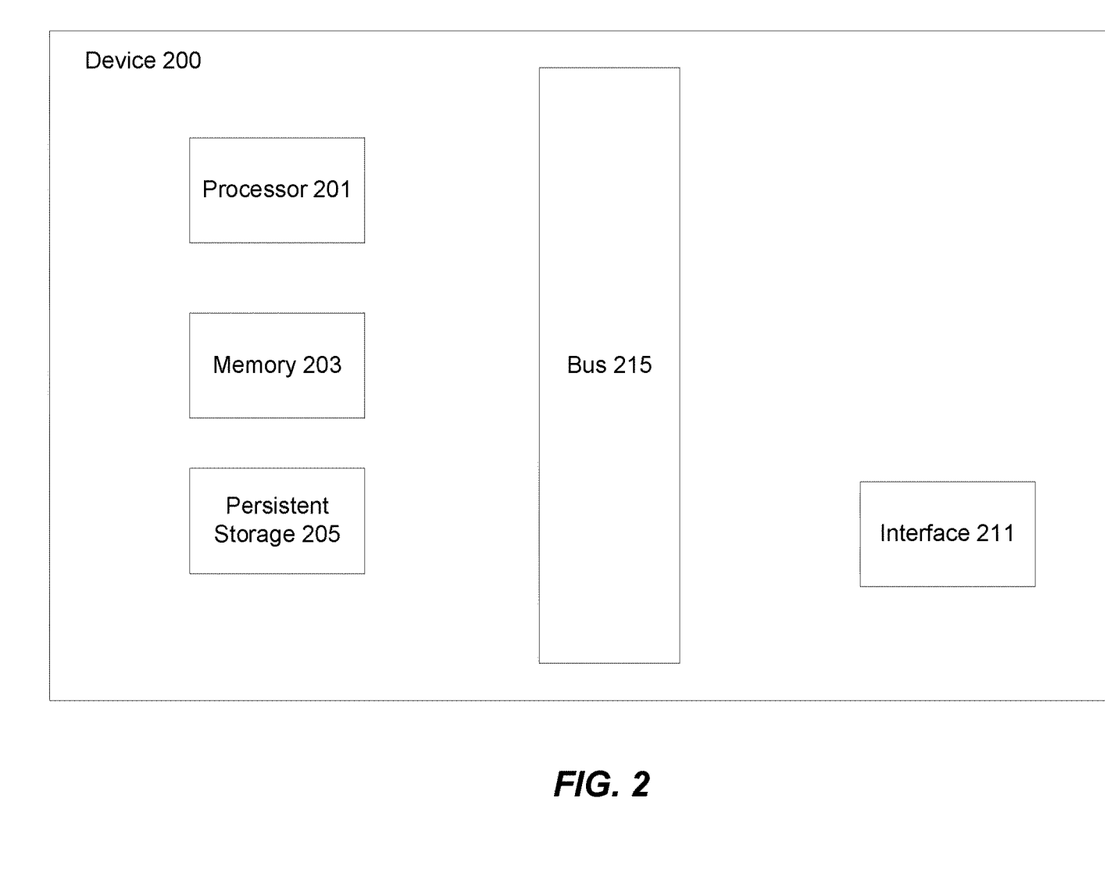
FIG. 2 illustrates a particular example of a device that can be used in conjunction with the techniques and mechanisms disclosed herein.

FIG. 2 illustrates a particular example of a device that can be used in conjunction with the techniques and mechanisms disclosed herein. According to particular example embodiments, a device 200 suitable for implementing various components described above, such as data block tier controller 122 as well as other components of networked storage system 102. Moreover, device 200 may be suitable for implementing various components of client systems also described above. Particular embodiments may include a processor 201, a memory 203, an interface 211, persistent storage 205, and a bus 215 (e.g., a PCI bus). For example, the device 200 may act as a data block tier controller such as data block tier controller 122 shown in FIG. 1. When acting under the control of appropriate software or firmware, the processor 201 is responsible for such tasks such as analyzing input and output activity, and updating blockmaps. Various specially configured devices can also be used in place of a processor 201 or in addition to processor 201. The complete implementation can also be done in custom hardware. The interface 211 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 205 may include disks, disk arrays, tape devices, solid state storage, non-volatile RAM, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the device 200 uses memory 203 to store data and program instructions and maintain a local side cache. The program instructions may control the operation of an operating system and/or one or more applications, for example. The memory or memories may also be configured to store received metadata and batch requested metadata.

Because various information and program instructions may be employed to implement the systems/methods described herein, the present invention relates to non-transitory machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 3:
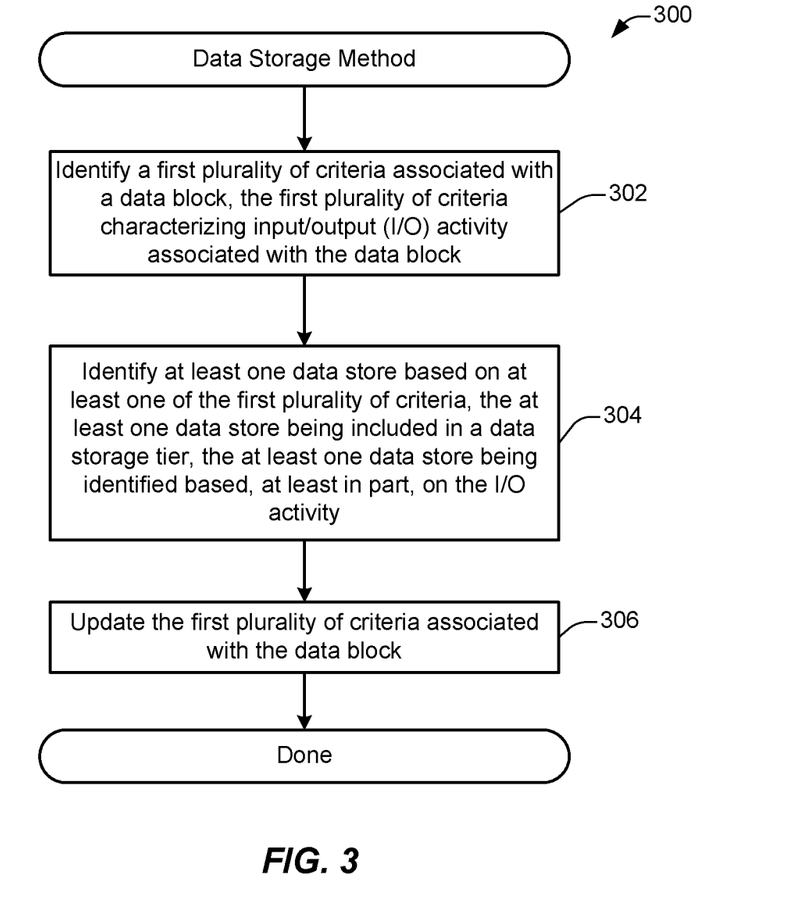
FIG. 3 illustrates a flow chart of an example of a data storage method, implemented in accordance with some embodiments.

FIG. 3 illustrates a flow chart of an example of a data storage method, implemented in accordance with some embodiments. As previously discussed, various components of a networked storage system, which may be configured as a deduplication repository, may analyze input and output patterns of data blocks included in a block device that resides in the deduplication repository. Such components may further identify particular data stores suitable for storage of the data blocks, implement data transfer operations if appropriate, and update a blockmap associated with the data blocks. In this way, data blocks may be distributed to suitable data stores on different data storage tiers having different input/output characteristics, such as latencies, to increase the efficiency with which such data blocks are accessed, and increase the efficiency of the utilization of limited hardware resources.

Method 300 may commence with operation 302 during which a first plurality of criteria may be identified. In various embodiments, the first plurality of criteria may be associated with a data block included in a plurality of data blocks. Furthermore, the first plurality of criteria may characterize input/output (I/O) activity associated with the data block. Accordingly, various criteria characterizing types of accesses, such as reads or writes, as well as frequency of accesses may be identified. As will be discussed in greater detail below, the criteria may include various other information as well, and such criteria may collectively characterize input/output patterns associated with each data block included in a particular blockmap of a file or exported block device residing in a networked storage system configured as a deduplication repository.

In various embodiments, a data block may be identified based on a blockmap and an index. In various embodiments, the blockmap characterizes a file stored in a deduplication repository, which may be a networked storage system described above. Furthermore, the index may identify data store identifiers, reference count data, and a second plurality of criteria associated with the plurality of data blocks. As will be discussed in greater detail below, such second criteria may include the first criteria.

Method 300 may commence with operation 304 during which at least one data store may be identified based on at least one of the first plurality of criteria. In some embodiments, the at least one data store is included in a data storage tier of a plurality of data storage tiers. Moreover, the at least one data store is identified based, at least in part, on the I/O activity associated with the data block. As discussed above, there may be several data stores available on different data storage tiers, and the data storage tiers may have different latency characteristics. Accordingly, a component, such as a data block tier controller, may identify a particular data store that is suitable for storage of the data block, and such a data store may be identified based on the previously described input/output activity. Additional details of such identification of data stores are discussed in greater detail below with reference to FIG. 4 and FIG. 5.

Method 300 may commence with operation 306 during which the first plurality of criteria stored in the index and associated with the data block may be updated. Accordingly, criteria stored and maintained by the deduplication repository may be updated to accurately represent the most recent data storage information associated with the data block. As will be discussed in greater detail below with reference to FIG. 4 and FIG. 5, if any changes were made to a storage location of the data block, such changes may be reflected in the updated index and blockmap. While method 300 describes operations implemented on a particular data block, it will be appreciated that such a method may be repeated for all data blocks identified by an index and blockmap. In this way, method 300 may be implemented for all data blocks of a deduplication repository, and may be an ongoing background process executed on the deduplication repository.

Figure 4:
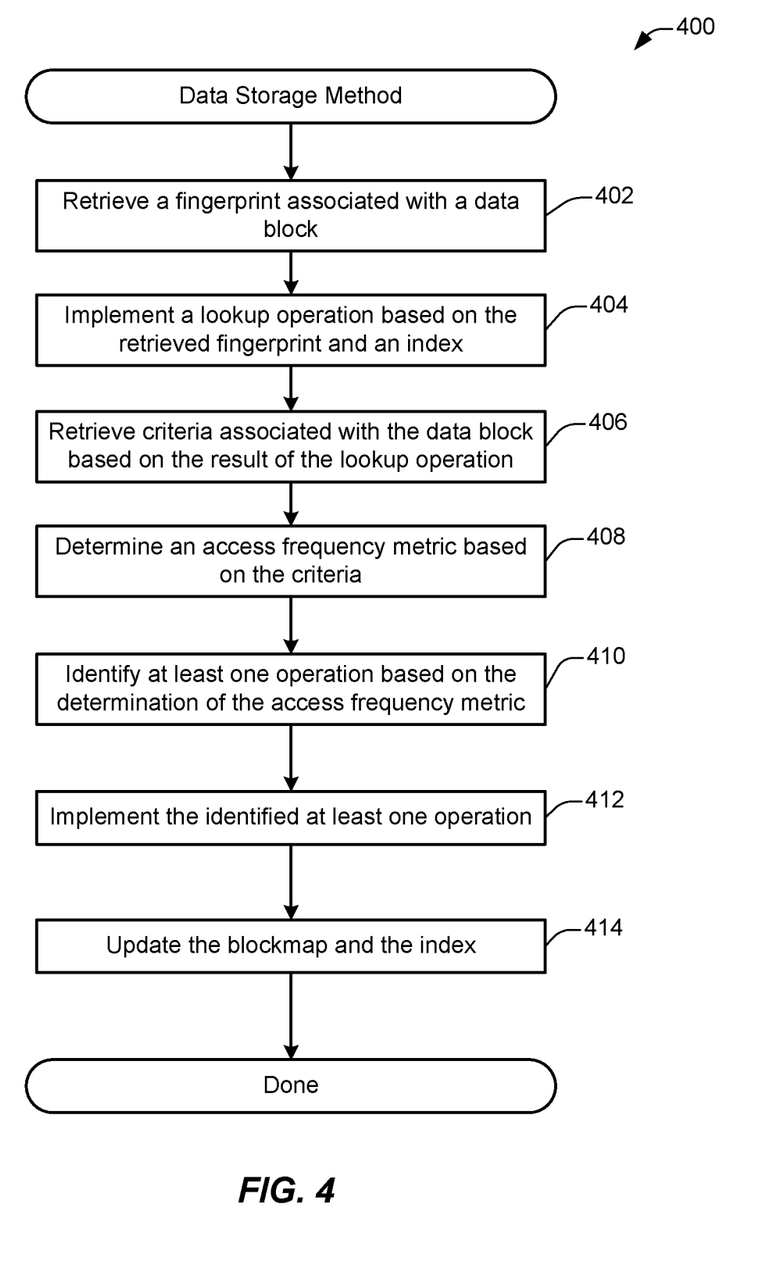
FIG. 4 illustrates a flow chart of another example of a data storage method, implemented in accordance with some embodiments.

FIG. 4 illustrates a flow chart of another example of a data storage method, implemented in accordance with some embodiments. As will be discussed in greater detail below, data blocks of ingested data in a deduplication repository may be identified, and such data blocks may be stored in data stores on one or more particular tiers of data storage based on input and output activity associated with such data blocks. In this way, data blocks may be distributed to suitable data stores having different input/output characteristics, such as latencies, to increase the efficiency with which such data blocks are accessed, and increase the efficiency of the utilization of limited hardware resources. As will be discussed in greater detail below, method 400 may be implemented responsive to and as part of the ingestion of data which may include several data blocks. Moreover, method 400 may be implemented as part of a crawler that periodically observes I/O activity and continually implements data storage adjustments.

Method 400 may commence with operation 402 during which a fingerprint associated with a data block may be retrieved. In various embodiments, incoming streams into a deduplicaton repository, via a protocol, are parsed into data chunks or data blocks. Unique representations of these data blocks received at a deduplication repository may be generated by a system component, such as a fingerprinter. Accordingly, the unique representations may be fingerprints generated based on an algorithm, such as a SHA1 hash function. The fingerprints may be stored at the deduplication repository. In some embodiments, the fingerprints may be stored in a blockmap and an index. In this way, the deduplication repository may store compressed representations of all data blocks stored in a file or exported block device implemented at the deduplication repository.

As discussed above, the blockmaps may be stored and maintained at the deduplication repository. The blockmap, representing an ingested file or exported block device in the deduplication repository, may represent, for example, file offsets and fingerprints of a data block. The fingerprint can be used as a key to an index to retrieve information regarding where to the data block is stored. For example, the information may include the data block's location in a data store in one data storage tier, or two data stores in two different data storage tiers. Additional details of the generation and maintenance of blockmaps are discussed in greater detail below. In various embodiments, an index may store the fingerprints as well as associated data values characterizing input and output activity for each data block, as will be discussed in greater detail below.

During operation 402, a particular data block may be selected by a system component, such as a data block tier controller for analysis. Such selection may be made at random, or the data block tier controller may periodically cycle through all data blocks identified by the entries included in a blockmap. In this way, a data block may be identified and selected, and an associated fingerprint may be retrieved from the index.

Method 400 may proceed to operation 404 during which a lookup operation may be performed based on the retrieved fingerprint. Accordingly, the fingerprint retrieved during operation 402 may be compared against fingerprints stored in the index. As discussed above, the index may store fingerprints of all data blocks stored in the block device unit of the deduplication repository as well as various associated data. Accordingly, the index may be queried to see if any entry matches the fingerprint retrieved during operation 402. If a match is found, method 400 may proceed to operation 406. If no match is found, a new entry may be generated within the index. In various embodiments, when the data block is a new data block that does not exist in the system and no match is found in the index, the data block may be stored in a data storage tier that is selected based on a designated rule or policy. For example, if the designated policy indicates that the new data block should be stored on a low latency SSD data storage tier, then the new data block may be stored in a data store in such a data storage tier.

In various embodiments, a component, such as a data block tier controller, may be configured to generate an index if no index is found or exists in the system. Accordingly, in some embodiments, and additional operation may be implemented during or prior to operation 404 in which a component, such as the data block tier controller, observes and tracks I/O activity for data blocks included in a blockmap over a designated period of time. Accordingly, the data block tier controller may record and track read and write access to each data block in a blockmap, and may generate index data based on the tracked information. For example, the data block tier controller may generate an access frequency metric based on tracked accesses, as well as other data such as timestamp information and recency data. Moreover, the data block tier controller may generate additional values for data fields such as data store and data tier identifiers. In one example, such identifiers may be generated based on a default setting and may be assigned to a default data store in a default data tier. In another example, such identifiers may be generated based on the tracked access data and generated access frequency metric, and in accordance with latency characteristics of the data storage tiers. The generated index may also include the fingerprints of the data blocks. In this way, if no index is present, one may be dynamically generated.

Method 400 may proceed to operation 406 during which several criteria associated with the data block may be retrieved. In various embodiments, the criteria may be one or more of the data values stored in the index that characterize input and output activity of the data block. For example, the criteria may include various data store identifiers, reference count information, access time and other recency information, and an access frequency metric that characterizes how often a data block is accessed. More specifically, for each fingerprint, the index may also store an associated first data store identifier, second data store identifier, reference count, access frequency metric, and access timestamp. In various embodiments, the data store identifiers may include additional identifiers, such as a tier identifier and a unique identifier which may be unique within each tier of data storage. Accordingly, the tier identifier may identify a tier of data storage in which a data store has been allocated, and may be a numerical identifier, such as a number from 1 to 4 if there are four tiers of data storage. The unique identifier may identify a particular data store within that tier if such a tier includes multiple data stores. In various embodiments, the first data store identifier may identify a first data store at which a data block is stored. Moreover, the second data store identifier may identify a second data store at which a data block is also stored, if applicable. Additional details regarding such identifiers and their usage are discussed in greater detail below.

In various embodiments, the reference count may identify a number of times the data block exists in all blockmaps in the system. The access frequency metric may identify a frequency with which a data block is accessed for read and write operations. The access frequency metric may be determined by counting the number of accesses over a period of time to determine a frequency or rate, and assigning a metric based on the determined frequency or rate. The metric may be a numerical score, such as integers from 1 to 5, or may be a qualitative score, such as an indication of temperature such as "icecold", "cold", "lukewarm", "warm", and "hot". The access timestamp may identify a time and date of a last access.

Method 400 may proceed to operation 408 during which an access frequency metric may be determined based, at least in part, on the criteria. As discussed above, the retrieved criteria may include various information, such as data store identifiers, existing access frequency metrics which may have been previously determined, as well as other identifiers and metrics. In various embodiments, a system component, such as a data block tier controller, may analyze the criteria to generate an access frequency metric. As discussed above, the access frequency metric may be generated based on a calculated rate of accesses associated with a particular data block.

In various embodiments, when a fingerprint is looked up in the index, it the result may yield a data structure which contains one or two data storage tier identifiers (IDs) that identify where the data block associated with the fingerprint is located or stored. This data structure may also include a data field that may characterize an access frequency metric, such as "temperature", which is a calculated and persistent metric that indicates how often the data block is being accessed. If the data block is accessed very frequently, then the temperature may be "hot". Such access frequency metrics may be selected from a set such as {hot, warm, lukewarm, cold, icecold}. The access frequency metric may be calculated based on a weighted formula which uses various parameters. For example, such a weighted formula may use a first parameter, such as a time elapsed since a last access (this may be stored in a data field of an index entry designated "access time". The data field, "access time" is updated when a chunk or data block is first stored or whenever it is accessed for a read. The weighted formula may also use a second parameter such as a last value of data field that stores the access frequency metric or "temperature". Initially, this value of the data field may be set to a default value such as "icecold" or "0". In various embodiments, the formula adjusts the resulting access frequency metric or "temperature" to be within the range of {hot-icecold} by mapping a number of access over a period of time to a particular access frequency metric.

The weighted formula may also use a third parameter such as a data field identifying a "reference count" of the data block. Such a reference count may be the total number of blockmaps referencing this data block. If the reference count is high, the data block is very popular, accessed, frequently, and the likelihood of an incoming read requiring that data block is high and the likelihood of an incoming write that will result in a reference to this already existing data block is high.

Method 400 may proceed to operation 410 during which an operation may be identified based, at least in part, on the determination of the access frequency metric. In various embodiments, the operation may be a data transfer or data storage operation. For example, the operation may be a data replication operation in which data is replicated to a target location while still being retained at its original location. The operation may also be a data migration operation in which data is moved to a target location and deleted at its original location. In various embodiments, the operation may be determined based on the value of the access frequency metric, or may be triggered by a change in the access frequency metric. Accordingly, the data block tier controller may analyze the determined access frequency metric as well as changes of the determined access frequency metric, which was determined during operation 408, relative to previous access frequency metrics for that data block that may have been retrieved during operation 406. The data block tier controller may identify one or more operations based on such an analysis, as will be discussed in greater detail below.

For example, a deduplication repository may include several tiers of data storage which each have different input and output characteristics. More specifically, a deduplication repository may have four tiers of data storage which may be identified by tier identifiers 1, 2, 3, and 4, respectively. In some embodiments, the tiers of data storage may be ordered in ascending order of access latency. Accordingly, tier 1 may have the lowest latency, tier 2 may have a higher latency than tier 1, tier 3 may have a higher latency than tier 2, and tier 4 may have the highest latency. The different tiers may also be different storage mediums having different characteristics that result in such latencies. For example, tier 1 may be a fast hard disk, such as a solid state drive (SSD). Tier 2 may be a slower hard disk that has greater storage capacity, such as a SATA disk drive. Tier 3 may be a storage medium that is slower than a SATA disk, such as a Blueray jukebox. Moreover, tier 4 may be slower than the previous three, and may be a storage entity, such as a cloud storage device. As discussed above with reference to operation 408, access frequency metrics may be quantitative such as numbers of "1", "2", "3", "4", and "5". Moreover, access frequency metrics may be qualitative, such as indicators of "icecold", "cold", "lukewarm", "warm", and "hot".

In various embodiments, the data block tier controller may be configured to identify operations based on the access frequency metrics as well as changes in such access frequency metrics, and such operations may be configured such that data blocks are stored in appropriate tiers of data storage based on their access frequencies. As discussed above, an access frequency metric may be determined for a particular data block, and such a data block may have also had a previously stored access frequency metric that may have been calculated during a previous iteration of method 400. Accordingly, the data block tier controller may analyze the currently determined access frequency metric, and compare it with the previous access frequency metric to identify an operation.

In one example, if the access frequency metric changes from warm to hot, the data block tier controller may identify a replication operation that replicates the data block between tier 2 and tier 1. If the access frequency metric changes from warm or lukewarm to cold, the data block tier controller may identify a migrate operation that migrates the data block from tier 2 to tier 3. If the access frequency metric changes from cold to icecold, the data block tier controller may identify a migrate operation that migrates the data block from tier 3 to tier 4. If the access frequency metric changes from icecold to cold, the data block tier controller may identify a migrate operation that migrates the data block from tier 4 to tier 3. If the access frequency metric changes from cold to lukewarm, the data block tier controller may identify a replicate operation that replicates the data block from tier 3 to tier 2. If the access frequency metric changes from lukewarm to warm, the data block tier controller may indicate that no operation should be implemented. If the access frequency metric changes from warm to lukewarm, the data block tier controller may indicate that operation should be implemented. A summary of such a mapping of changes to operations is provided in Table 1 illustrated below.

TABLE 1

| Access Frequency Metric change | Action |
| --- | --- |
| Warm to Hot | Replicate between tier 2 and tier 1 |
| Warm/Lukewarm to Cold | Migrate from tier 2 to tier 3 |
| Cold to Icecold | Migrate from tier 3 to tier 4 |
| Icecold to Cold | Migrate from tier 4 to tier 3 |
| Cold to Lukewarm | Replicate from tier 3 to tier 2 |
| Lukewarm to warm | — |
| Warm to Lukewarm | — |

Method 400 may proceed to operation 412 during which the operation may be implemented. Accordingly, as will be discussed in greater detail below with reference to FIG. 5, if it is determined that an operation should be implemented, and if a type of operation is identified, a system component, such as a data block tier controller, may implement the operation to replicate or migrate the data block to the appropriate target data store. Thus, if a replicate operation is identified, the data block may be replicated to the target data store and may also remain at its original storage location. If a migrate operation is identified, the data block may be stored at the target data store, and may be deleted from its original storage location.

Method 400 may proceed to operation 414 during which the blockmap and the index may be updated. Accordingly, data fields of the blockmap and index may be updated to accurately reflect any modifications that have been made. For example, data store identifiers of the criteria associated with the data block and stored in the index may be updated to identify the new storage location of the data block. Other relevant information may be updated as well, such as the current value of the access frequency metric. In this way, the blockmap and index may be updated to accurately reflect the most recent information associated with the data block.

While the above described example illustrates one possible implementation of such tiers of storage and access frequency metrics, any suitable number of tiers of storage may be implemented with any suitable type of access frequency metrics. For example, various embodiments disclosed herein may be implemented with fewer tiers of data storage, such as two tiers or three tiers. Moreover, various embodiments, disclosed herein may be implemented with more tiers of data storage, such as five tiers or six tiers. Moreover, instead of qualitative temperature indicators, numerical indicators may be implemented. Accordingly, the above example is not intended to limit the scope of the concepts disclosed herein, but provide one of many illustrations on how such concepts may be implemented.

Figure 5:
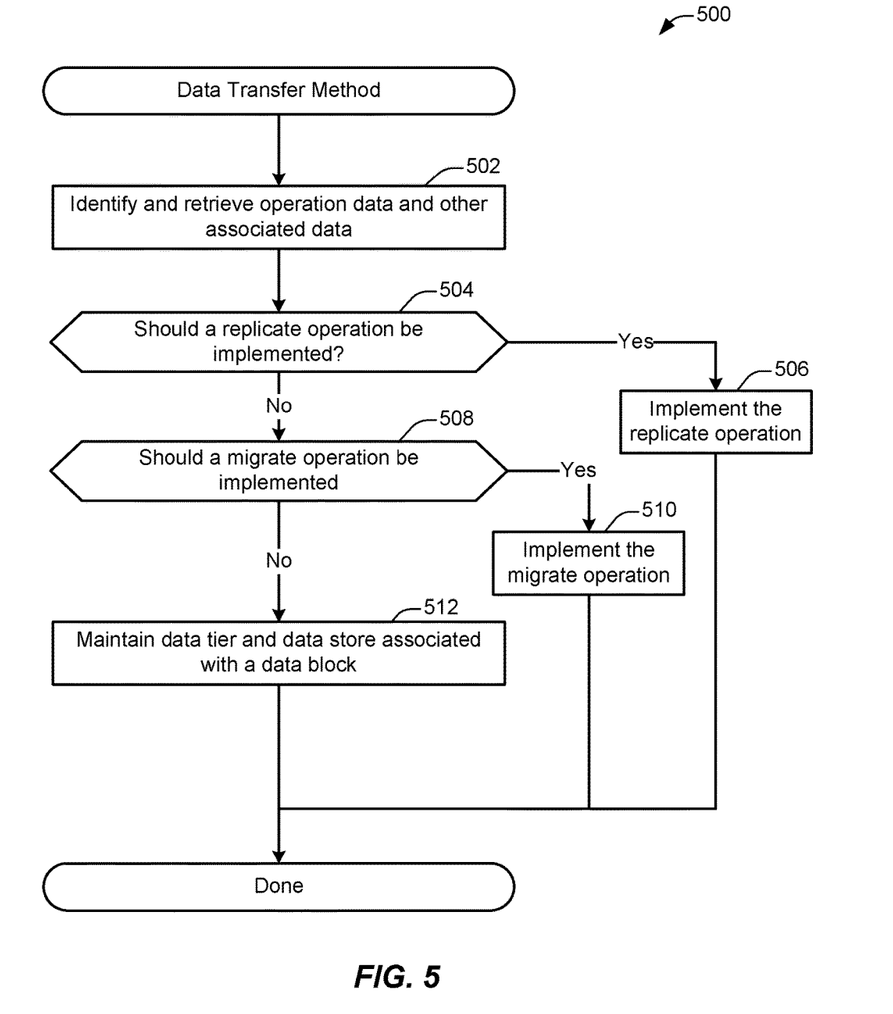
FIG. 5 illustrates a flow chart of an example of a data transfer method, implemented in accordance with some embodiments.

FIG. 5 illustrates a flow chart of an example of a data transfer method, implemented in accordance with some embodiments. As discussed above, data blocks included in a file or exported block device of a deduplication repository may be identified, and such data blocks may be stored on one or more particular tiers of data storage based on input and output activity associated with such data blocks. As will be discussed in greater detail below, data blocks included in a file or exported block device of a deduplication repository may be distributed across several tiers of data storage that may have different characteristics, such as latency characteristics. Accordingly, the data blocks may be analyzed and stored in particular tiers of data storage based on input/output access patterns of the data blocks as well as characteristics of the tiers of data storage.

Method 500 may commence with operation 502 during which operation data and other associated data may be identified and retrieved. In various embodiments, a system component, such as a data block tier controller, may identify operation data which may include one or more criteria associated with a data block. As will be discussed in greater detail below, the operation data may be used to identify a type of operation that may be a type of data storage or data transfer operation, such as a replication operation or a migration operation. In some embodiments, the type of operation may be identified based on one or more tier identifiers associated with the data block, as well as an access frequency metric. As previously discussed, such criteria and metrics may be identified and retrieved based on a lookup operation performed based on a fingerprint of the data block. Accordingly, during operation 502, such identifiers and metrics may be retrieved for a particular data block.

Method 500 may proceed to operation 504 during which it may be determined if the operation is a replicate operation. In various embodiments, and as similarly discussed above, such a determination may be made based, at least in part, on a tier identifier included in the retrieved operation data. Such a tier identifier in combination with an access frequency metric may be used to identify particular types of operations, and target data tiers associated with such operations. For example, as discussed above with reference to Table 1, if a data block is stored in a tier that supports both replicate and migrate operations, and the access frequency metric indicates an increase in access frequency, a replicate operation may be identified, and a target data tier and store may also be identified. The target data tier may be the data tier that has the next lowest latency then the current data tier such as, for example, from data tier 3 to data tier 2. A data store within the data tier may be randomly assigned, or may be assigned in a serial manner. Accordingly, if it is determined that the operation is a replicate operation, method 500 may proceed to operation 506. If it is determined that the operation is not a replicate operation, method 500 may proceed to operation 508.

Accordingly if it is determined that the operation is a replicate operation, method 500 may proceed to operation 506 during which a data transfer operation that is a replicate operation may be implemented. Accordingly a target data store in a target data tier may be identified and allocated, and the data block may be copied to that target data store. In this way, data blocks may be replicated to tiers having lower latencies responsive to increases in input/output activity characterized by their access frequency metrics. Moreover, when a replicate operation is implemented, a data block may exist in two data stores on two different data tiers. Furthermore, a fingerprint of the data block may be added to an LRU of the target data tier. Accordingly, once implemented, an index entry associated with the data block that was replicated may include a first data store identifier may identify the tier and data store from which the data block was replicated, and a second data store identifier that may identify the tier and data store to which the data block was replicated. Once the replicate operation is implemented, method 500 may terminate.

Returning to operation 504, if it is determined that the operation is not a replicate operation, method 500 may proceed to operation 508 during which be determined if the operation is a migrate operation. In various embodiments, and as also discussed above with reference to Table 1, if a data block is stored in a tier that supports migrate operations, and the access frequency metric indicates an decrease in access frequency, a migrate operation may be identified, and a target data tier and store may also be identified. The target data tier may be the data tier that has the next highest latency then the current data tier such as, for example, from data tier 3 to data tier 4. A data store within the data tier may be randomly assigned, or may be assigned in a serial manner. Accordingly, if it is determined that the operation is a migrate operation, method 500 may proceed to operation 510. If it is determined that the operation is not a replicate operation, method 500 may proceed to operation 512.

Accordingly, if it is determined that the operation is a migrate operation, method 500 may proceed to operation 510 during which a data transfer operation that is a replicate operation may be implemented. Accordingly a target data store in a target data tier may be identified, and the data block may be migrated to that target data store. In this way, data blocks may be migrated to tiers having higher latencies responsive to decreases in input/output activity characterized by their access frequency metrics. Moreover, when a migrate operation is implemented, a data block may be removed or deleted from its previous data store, and may exist in one data store on one data tier. Once the migrate operation has been implemented, method 500 may terminate.

Returning to operation 508, if it is determined neither a replicate or migration operation should be implemented, method 500 may proceed to operation 512 during which the data tier and data store associated with the data block are maintained. Accordingly, no changes may be made to the storage location of the data block, and no data transfer operation may be implemented. In this way, a system component, such as a data block tier controller, may maintain a current storage location of a data block if no migration or replication operation is to be implemented.

Because various information and program instructions may be employed to implement the systems/methods described herein, the present invention relates to non-transitory machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
 identifying a first plurality of criteria associated with a data block included in a plurality of data blocks, the data block being identified based on a blockmap and an index, the blockmap characterizing a file stored in a deduplication repository, the index identifying data store identifiers, reference count data, and a second plurality of criteria associated with the plurality of data blocks, the second plurality of criteria including the first plurality of criteria, the first plurality of criteria characterizing input/output (I/O) activity associated with the data block;
 identifying at least one data store based on at least one of the first plurality of criteria, the at least one data store being included in a data storage tier of a plurality of data storage tiers, the at least one data store being identified based, at least in part, on the I/O activity associated with the data block; and updating the first plurality of criteria stored in the index and associated with the data block.

2. The method of claim 1, wherein the first plurality of criteria comprises a first data store identifier, second data store identifier, a reference count, an access frequency metric, and a data access timestamp.

3. The method of claim 2, wherein the access frequency metric characterizes a frequency at which the data block is accessed.

4. The method of claim 2 further comprising:
implementing at least one data transfer operation on the data block, the data transfer operation being identified based on the first plurality of criteria,
wherein the at least one data store is a first data store of a plurality of data stores, and wherein the plurality of data stores further comprises a second data store.

5. The method of claim 4, wherein the data transfer operation is a data replication operation from the first data store included in a first data storage tier to the second data store included in a data second storage tier.

6. The method of claim 4, wherein the data transfer operation is a migrate operation from the first data store included in a data storage tier to a second data store included in a second data storage tier.

7. The method of claim 4, wherein the plurality of data stores further comprises a third data store included in a third data storage tier and a fourth data store included in a fourth data storage tier.

8. The method of claim 7, wherein the first data storage tier has the lowest access latency, wherein the second data storage tier has the second lowest access latency, wherein the third data storage tier has the third lowest access latency, and wherein the fourth data storage tier has the highest access latency.

9. The method of claim 1, wherein the at least one data store and an associated data storage tier is identified based on the index.

10. The method of claim 9 further comprising:
generating the index based on a plurality of I/O patterns associated with a plurality of data blocks included in the blockmap of the deduplication repository,
wherein the I/O patterns characterize data storage and access requests associated with the plurality of data blocks.

11. A system comprising:
a local machine;
a networked storage device comprising one or more processors configured to:
identify a first plurality of criteria associated with a data block included in a plurality of data blocks, the data block being identified based on a blockmap and an index, the blockmap characterizing a file stored in a deduplication repository, the index identifying data store identifiers, reference count data, and a second plurality of criteria associated with the plurality of data blocks, the second plurality of criteria including the first plurality of criteria, the first plurality of criteria characterizing input/output (I/O) activity associated with the data block;
identify at least one data store based on at least one of the first plurality of criteria, the at least one data store being included in a data storage tier of a plurality of data storage tiers, the at least one data store being identified based, at least in part, on the I/O activity associated with the data block; and
update the first plurality of criteria stored in the index and associated with the data block.

12. The system of claim 11, wherein the first plurality of criteria comprises a first data store identifier, second data store identifier, a reference count, an access frequency metric, and a data access timestamp, and wherein the access frequency metric characterizes a frequency at which the data block is accessed.

13. The system of claim 12, wherein the one or more processors are further configured to:
implement at least one data transfer operation on the data block, the data transfer operation being identified based on the plurality of criteria,
wherein the at least one data store is a first data store of a plurality of data stores, and wherein the plurality of data stores further comprises a second data store.

14. The system of claim 11, wherein the at least one data store is identified based on the index.

15. The system of claim 14, wherein the one or more processors are further configured to:
generate the index based on a plurality of I/O patterns associated with a plurality of data blocks included in the blockmap of the deduplication repository,
wherein the I/O patterns characterize data storage and access requests associated with the plurality of data blocks.

16. A device comprising:
a communications interface configured to be communicatively coupled with a local machine; and
one or more processors configured to:
identify a first plurality of criteria associated with a data block included in a plurality of data blocks, the data block being identified based on a blockmap and an index, the blockmap characterizing a file stored in a deduplication repository, the index identifying data store identifiers, reference count data, and a second plurality of criteria associated with the plurality of data blocks, the second plurality of criteria including the first plurality of criteria, the first plurality of criteria characterizing input/output (I/O) activity associated with the data block;
identify at least one data store based on at least one of the first plurality of criteria, the at least one data store being included in a data storage tier of a plurality of data storage tiers, the at least one data store being identified based, at least in part, on the I/O activity associated with the data block; and
update the first plurality of criteria stored in the index and associated with the data block.

17. The device of claim 16, wherein the first plurality of criteria comprises a first data store identifier, second data store identifier, a reference count, an access frequency metric, and a data access timestamp, and wherein the access frequency metric characterizes a frequency at which the data block is accessed.

18. The device of claim 17, wherein the one or more processors are further configured to:
implement at least one data transfer operation on the data block, the data transfer operation being identified based on the plurality of criteria,
wherein the at least one data store is a first data store of a plurality of data stores, and wherein the plurality of data stores further comprises a second data store.

19. The device of claim 16, wherein the at least one data store is identified based on the index.

20. The device of claim 19, wherein the one or more processors are further configured to:

generate the index based on a plurality of I/O patterns associated with a plurality of data blocks included in the blockmap of the deduplication repository, wherein the I/O patterns characterize data storage and access requests associated with the plurality of data blocks.

* * * * *